(12) United States Patent
Tiedemann, Jr. et al.

(10) Patent No.: US 6,396,867 B1
(45) Date of Patent: May 28, 2002

(54) METHOD AND APPARATUS FOR FORWARD LINK POWER CONTROL

(75) Inventors: Edward G. Tiedemann, Jr.; Keith W. Saints, both of San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 08/842,993

(22) Filed: Apr. 25, 1997

(51) Int. Cl.[7] .............................................. H04B 1/707
(52) U.S. Cl. ...................................... 375/141; 370/342
(58) Field of Search ................................ 375/200, 130, 375/140, 141, 147, 145; 370/318, 320, 335, 342, 441; 455/69, 522

(56) References Cited

U.S. PATENT DOCUMENTS

| | | | |
|---|---|---|---|
| 4,112,257 A | 9/1978 | Frost | 179/2 EB |
| 4,123,718 A | 10/1978 | Lampert et al. | 325/474 |
| 4,765,753 A | 8/1988 | Schmidt | 379/60 |
| 4,777,653 A | 10/1988 | Bonnerot et al. | 455/69 |
| 4,811,421 A | 3/1989 | Havel et al. | 455/69 |
| 4,868,795 A | 9/1989 | McDavid et al. | 367/77 |
| 4,870,698 A | 9/1989 | Katsuyama et al. | 455/67 |
| 4,901,307 A | 2/1990 | Gilhousen et al. | 370/18 |
| 5,056,109 A | 10/1991 | Gilhousen et al. | 375/1 |
| 5,093,840 A | 3/1992 | Schilling | 375/1 |
| 5,101,501 A | 3/1992 | Gilhousen et al. | 455/33 |
| 5,103,459 A | 4/1992 | Gilhousen et al. | 375/1 |
| 5,107,487 A | 4/1992 | Vilmur et al. | 370/18 |
| 5,128,965 A | 7/1992 | Henriksson | 375/58 |
| 5,204,876 A | 4/1993 | Bruckert et al. | 375/1 |
| 5,220,678 A | 6/1993 | Feei | 455/69 |
| 5,245,629 A | 9/1993 | Hall | 375/1 |
| 5,257,293 A | 10/1993 | Gilhousen et al. | 375/1 |
| 5,265,119 A | 11/1993 | Gilhousen et al. | 375/1 |
| 5,267,262 A | 11/1993 | Wheatley, III | 375/1 |
| 5,305,468 A | 4/1994 | Bruckert et al. | 455/69 |
| 5,383,219 A | 1/1995 | Wheatley, III et al. | 375/1 |
| 5,390,338 A | 2/1995 | Bodin et al. | 455/33.1 |
| 5,396,516 A | 3/1995 | Padovani et al. | 375/225 |
| 5,450,616 A | 9/1995 | Rom | 455/69 |
| 5,461,639 A | 10/1995 | Wheatley, III et al. | 375/205 |
| 5,465,399 A | 11/1995 | Oberholtzer et al. | 455/69 |
| 5,487,180 A | 1/1996 | Ohtake | 455/54.1 |
| 5,566,201 A | * 10/1996 | Ostman | 375/130 |
| 5,590,409 A | * 12/1996 | Sawahashi et al. | 455/69 |
| 5,604,730 A | * 2/1997 | Tiedemann, Jr. | 370/252 |

FOREIGN PATENT DOCUMENTS

| | | | |
|---|---|---|---|
| EP | 0682419 | 11/1995 | |
| WO | 9406218 | 3/1994 | H04Q/7/04 |
| WO | 9413066 | 6/1994 | |
| WO | 9631014 | 10/1996 | |

* cited by examiner

*Primary Examiner*—Don N. Vo
(74) *Attorney, Agent, or Firm*—Philip Wadsworth; Maryanne E. DeAngelo; Byron Yafuso

(57) ABSTRACT

A forward link power control mechanism measures the reverse link power control bits which are transmitted on the forward traffic channel. At the remote station, the reverse link power control bits from multiples base stations or multiple signal paths are measured, combined, and filtered to yield an improved measurement of the forward link signal quality. The reverse link power control bits which are deemed unreliable are omitted from use in the power control loop. The remote station generates a set of forward link power control bit in accordance with the measurements and transmits these bits to all base stations in communication with the remote station. Each base station adjusts its gain of the forward traffic channel in accordance to its measurement of the forward link power control bit. However, the gains of the forward traffic channels of the base stations are corrected periodically so that erroneous reception of the forward link power control bits by the base stations do not accumulate.

24 Claims, 8 Drawing Sheets

METHOD AND APPARATUS FOR FORWARD LINK POWER CONTROL

BACKGROUND OF THE INVENTION

I. Field of the Invention

The present invention relates to data communication. More particularly, the present invention relates to a novel and improved method and apparatus for the forward link power control in a communication system.

II. Description of the Related Art

The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation techniques of CDMA have significant advantages over other modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention and is incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM," also assigned to the assignee of the present invention and is incorporated by reference herein. Furthermore, the CDMA system can be designed to conform to the "TIA/EIA/IS-95-A Mobile Station-Base Station Compatibility Standard for Dual-Mode Wideband Spread Spectrum Cellular System", hereinafter referred to as the IS-95-A standard or TIA/EIA/IS-95A.

CDMA, by its inherent nature of being a wideband signal, offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links to a mobile user or remote station through two or more base stations. Furthermore, path diversity may be obtained by exploiting the multipath environment through spread spectrum processing by allowing signals arriving with different propagation delays to be received and processed separately. Examples of path diversity are illustrated in U.S. Pat. No. 5,101,501 entitled "METHOD AND SYSTEM FOR PROVIDING A SOFT HANDOFF IN COMMUNICATIONS IN A CDMA CELLULAR TELEPHONE SYSTEM," and U.S. Pat. No. 5,109,390 entitled "DIVERSITY RECEIVER IN A CDMA CELLULAR TELEPHONE SYSTEM," both assigned to the assignee of the present invention and incorporated by reference herein.

The reverse link refers to a transmission from a remote station to a base station. On the reverse link, each transmitting remote station acts as an interference to other remote stations in the network. Therefore, the reverse link capacity is limited by the total interference due to transmissions from other remote stations. The CDMA system increases the reverse link capacity by transmitting fewer bits, thereby using less power and reducing interference, when the user is not speaking.

To minimize interference and maximize the reverse link capacity, the transmit power of each remote station is controlled by three reverse link power control loops. The first power control loop adjusts the transmit power of the remote station by setting the transmit power inversely proportional to the received power on the forward link. In an IS-95-A system, the transmit power is given by $p_{out}=-73-p_{in}$ where $p_{in}$ is the power received by the remote station given in dBm, $p_{out}$ is the transmit power of the remote station given in dBm, and $-73$ is a constant. This power control loop is often called the open loop.

The second power control loop adjusts the transmission power of the remote station such that the signal quality, as measured by the energy-per-bit-to-noise-plus-interference ratio $E_b/I_o$, of the reverse link signal received at the base station is maintained at a predetermined level. This level is referred to as the $E_b/I_o$ set point. The base station measures the $E_b/I_o$ of the reverse link signal received at the base station and transmits a reverse link power control bit to the remote station on the forward traffic channel in response to the measured $E_b/I_o$. The reverse power control bits are set 16 times per 20 msec frame, or at an 800 bps rate. The forward traffic channel carries the reverse link power control bits along with the data from the base station to the remote station. This second loop is often called the inner closed loop.

The CDMA communication system typically transmits packets of data as discrete data frames. Thus, the desired level of performance is typically measured by the frame-error-rate (FER). The third power control loop adjusts the $E_b/I_o$ set point such that the desired level of performance, as measured by the FER, is maintained. The required Eb/I0 to obtain a given FER depends upon the propagation conditions. This third loop is often called the outer closed loop. The power control mechanism for the reverse link is disclosed in detail in U.S. Pat. No. 5,056,109, entitled "METHOD AND APPARATUS FOR CONTROLLING TRANSMISSION POWER IN A CDMA CELLULAR MOBILE TELEPHONE SYSTEM", assigned to the assignee of the present invention and incorporated by reference herein.

The forward link refers to a transmission from a base station to a remote station. On the forward link, the transmission power of the base station is controlled for several reasons. A high transmission power from the base station can cause excessive interference with the signals received at other remote stations. Alternatively, if the transmission power of the base station is too low, the remote station can receive erroneous data transmissions. Terrestrial channel fading and other known factors can affect the quality of the forward link signal as received by the remote station. As a result, each base station attempts to adjust its transmission power to maintain the desired level of performance at the remote station.

Power control on the forward link is especially important for data transmissions. Data transmission is typically asymmetric with the amount of data transmitted on the forward link being greater than on the reverse link. With an effective power control mechanism on the forward link, wherein the transmission power is controlled to maintain the desired level of performance, the overall forward link capacity can be improved.

A method and apparatus for controlling the forward link transmission power is disclosed in U.S. Pat. No. 6,835,209, entitled "METHOD AND APPARATUS FOR PERFORMING FAST FORWARD POWER CONTROL IN A MOBILE COMMUNICATION art SYSTEM", hereinafter the '209 patent, filed Mar. 31, 1995, now abandoned, assigned to the assignee of the present invention and incorporated by reference herein. In the method disclosed in the '209 patent, the remote station transmits an error-indicator-bit (EIB) message to the base station when a transmitted frame of data is received in error. The EIB can be either a bit contained in the reverse traffic channel frame or a separate message sent on the reverse traffic channel. In response to the EIB message, the base station increases its transmission power to the remote station.

One of the disadvantages of this method is the long response time. The processing delay encompasses the time interval from the time the base station transmits the frame with inadequate power to the time the base station adjusts its transmission power in response to the error message from the remote station. This processing delay includes the time it takes for (1) the base station to transmit the data frame with inadequate power, (2) the remote station to receive the data frame, (3) the remote station to detect the frame error (e.g. a frame erasure), (4) the remote station to transmit the error message to the base station, and (5) the base station to receive the error message and appropriately adjust its transmission power. The forward traffic channel frame must be received, demodulated, and decoded before the EIB message is generated. Then the reverse traffic channel frame carrying the EIB message must be generated, encoded, transmitted, decoded, and processed before the bit can be used to adjust the transmit power of the forward traffic channel.

Typically, the desired level of performance is one percent FER. Therefore, on the average, the remote station transmits one error message indicative of a frame error every 100 frames. In accordance with the IS-95-A standard, each frame is 20 msec long. This type of EIB based power control works well to adjust the forward link transmit power to handle shadowing conditions, but due to its slow speed is ineffective in fading except in the slowest fading conditions.

A second method for controlling the forward link transmission power utilizes the $E_b/I_o$ of the received signal at the remote station. Since the FER is dependent on the $E_b/I_o$ of the received signal, a power control mechanism can be designed to maintain the $E_b/I_o$ at the desired level. This design encounters difficulty if data is transmitted on the forward link at variable rates. On the forward link, the transmission power is adjusted depending on the data rate of the data frame. At lower data rates, each data bit is transmitted over a longer time period by repeating the modulation symbol as described in TIA/EIA/IS95-A. The energy-per-bit $E_b$ is the accumulation of the received power over one bit time period and is obtained by accumulating the energy in each modulation symbol. For an equivalent amount of $E_b$, each data bit can be transmitted at proportionally less transmission power at the lower data rates. Typically, the remote station does not know the transmission rate a priori and cannot compute the received energy-per-bit $E_b$ until the entire data frame has been demodulated, decoded, and the data rate of the data frame determined. Thus, the delay of this method is about that described in the aforementioned U.S. Pat. No. 6,035,209 and the rate is one power control message per frame. This is in contrast with the reverse link approach in which there can be one power control message (bit) sixteen times per frame as in TIA/EIA/IS-95-A.

Other methods and apparatus for performing fast forward link power control are described in the aforementioned U.S. Pat. No. 6,035,209, U.S. patent application Ser. No. 08/559,386, entitled "METHOD AND APPARATUS FOR PERFORMING FAST FORWARD POWER CONTROL IN A MOBILE COMMUNICATION SYSTEM", filed Nov. 15, 1995, U.S. Pat. No. 5,903,554, entitled "METHOD AND APPARATUS FOR MEASURING LINK QUALITY IN A SPREAD SPECTRUM COMMUNICATION SYSTEM", filed Sep. 27, 1996, U.S. Pat. No. 5,893,035, entitled "CENTRALIZED FORWARD LINK POWER CONTROL", filed Sep. 16, 1996, and U.S. Pat. No. 6,075,974, entitled "METHOD AND APPARATUS FOR ADJUSTING THRESHOLDS AND MEASUREMENTS OF RECEIVED SIGNALS BY ANTICIPATING POWER CONTROL COMMANDS YET TO BE EXECUTED", filed Nov. 20, 1996, all are assigned to the assignee of the present invention and incorporated by reference herein.

The fundamental difference between the forward link and the reverse link is that the transmission rate does not need to be known on the reverse link. As described in the aforementioned U.S. Pat. No. 5,056,109, at lower rates, the remote station does not transmit continuously. When the remote station is transmitting, the remote station transmits at the same power level and the same waveform structure regardless of the transmission rate. The base station determines the value of a power control bit and sends this bit to the remote station 16 times per frame. Since the remote station knows the transmission rate, the remote station can ignore power control bits corresponding to times when it was not transmitting. This permits fast reverse link power control. However, the effective power control rate varies with the transmission rate. For TIA/EIA/IS-95-A, the rate is 800 bps for full rate frames and 100 bps for 1/8 rate frames.

An alternative reverse link architecture is described in the U.S. Pat. No. 5,930,230, entitled "HIGH DATA RATE CDMA WIRELESS COMMUNICATION SYSTEM", hereinafter the '230 patent, filed May, 28, 1996, assigned to the assignee of the present invention and incorporated by reference herein. In accordance with the '230 patent application, an auxiliary pilot is introduced into the reverse link. The pilot level is independent of the transmission rate on the reverse link. This permits the base station to measure the pilot level and to send the reverse link power control bit to the remote station at a constant rate.

SUMMARY OF THE INVENTION

The present invention is a novel and improved method and apparatus for high rate forward link power control. The present invention improves the response time of the forward link power control loop and allows for dynamic adjustment of the transmission power on the forward link by measuring the quality of the reverse link power control bits which are transmitted on the forward traffic channel at multiple times within a frame. Measurements over short time intervals allow the base station to dynamically adjust the transmission power to minimize interference to other base stations and maximize the forward link capacity. The improved response time allows the power control loop to effectively compensate for slow fading. For fast fading, the block interleaver in the communication system is effective.

In accordance with the present invention, the remote station measures the reverse link power control bits which are transmitted at a rate of 800 bits per second on the forward traffic channel. The reverse link power control bits are punctured into the forward traffic channel data stream. The gain of the power control bits is adjusted along with the gain of the forward link data bits. However, unlike the data bits, the transmission level of the power control bit is not scaled according to the data rate. The measured signal quality of the power control bits is used to adjust the transmission power of the base stations.

It is an object of the present invention to improve the response time of the forward link power control by the use of the energy measurements of the reverse link power control bits. The reverse link power control bits are transmitted at a rate of 800 bps. Thus, the forward link power control mechanism of the present invention can perform a measurement of the quality of the received forward traffic channels periodically every 1.25 msec. The measurements can be transmitted to the base stations for use in adjustment of the forward link transmission power. The improved response time allows the base stations to effectively compensate for slow fades in the channel and improve the performance of the forward traffic channels.

It is another object of the present invention to increase the capacity of forward link by allowing for rapid adjustments in the transmission power of the base stations. The power control mechanism of the present invention allows the base stations to transmit at the minimal transmission power necessary to maintain the requisite level of performance. Since the total transmission power of the base stations is fixed, minimal transmission for a given task results in a saving of transmission power which can be used for other tasks.

It is yet another object of the present invention to provide for a reliable forward link power control mechanism. At the remote station, the reverse link power control bits from multiple sectors of a base station or multiple signal paths from the same sector are combined to yield an improved measurement of the forward link signal quality. The reverse link power control bits which are deemed unreliable may be omitted from use in the power control loop. At the base stations, the forward link power control bits are received by all base stations in communication with the remote station. The gains of the forward traffic channels of the base stations are corrected periodically so that erroneous reception of the forward link power control bits by the base stations do not accumulate.

It is yet another object of this invention to provide a mechanism to adjust the forward link power to the desired frame error rate, similar to that done by the outer loop for the reverse link.

It is yet another object of this invention to provide a mechanism to communicate the power control bits between base stations. The power control bits which control the forward link transmit power may or may not have been correctly received at different base stations. The present invention provides base stations which receive erroneous power control bits with the information necessary to update their forward link transmit power.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
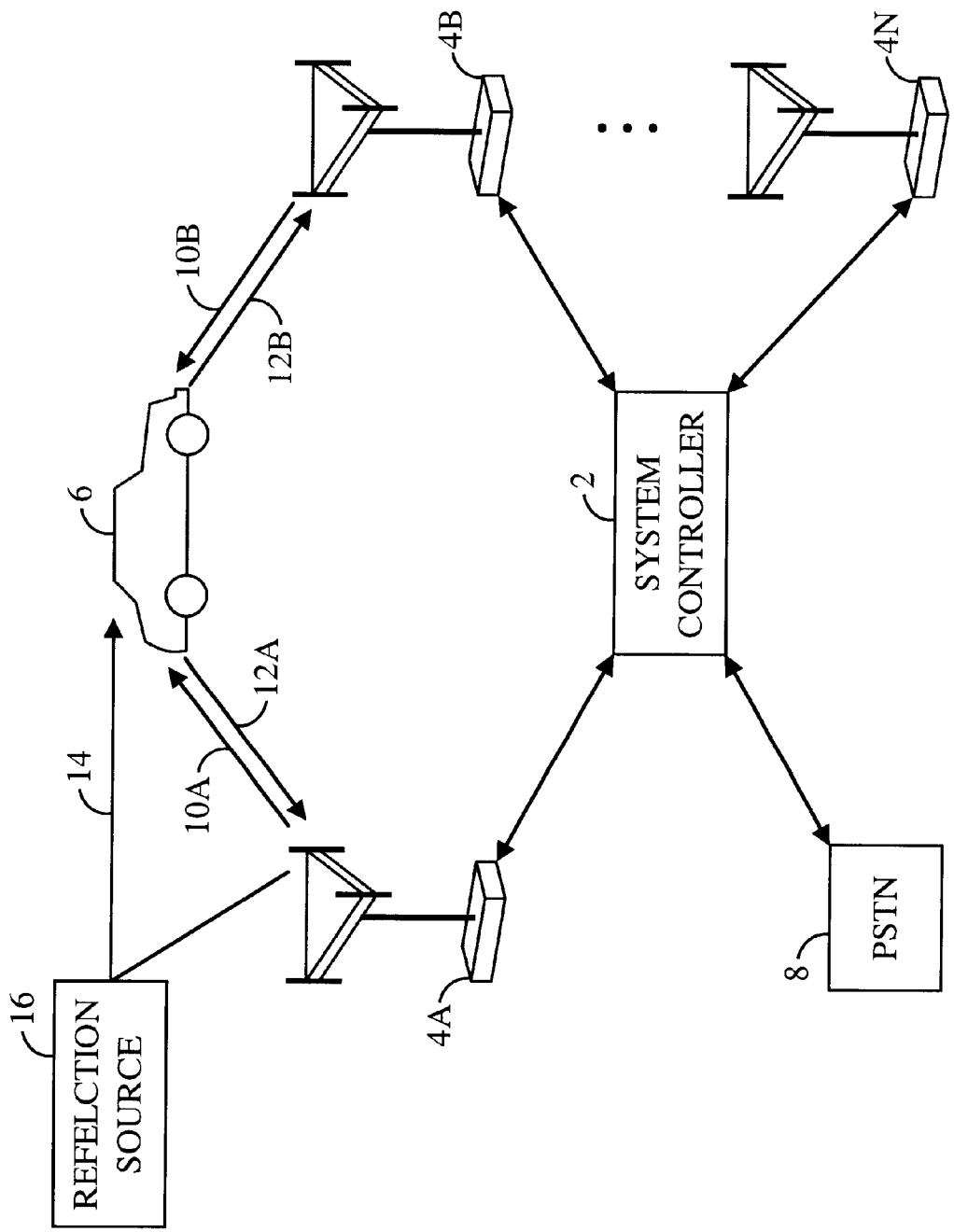
FIG. 1 is a diagram of the communication system of the present invention showing a plurality of base stations in communication with a remote station.

In the present invention, the base station transmits the reverse link power control bits along with the data on the forward traffic channel. The reverse link power control bits are used by the remote station to control its transmission power so as to maintain the desired level of performance while minimizing the interference to other remote stations in the system. The power control mechanism for the reverse link is disclosed in the aforementioned U.S. Pat. No. 6,035, 209. Because of sensitivity to processing delays, the reverse link power control bits are not encoded. In fact, the power control bits are punctured onto the data (see FIG. 3). In this sense, puncturing is a process by which one or more code symbols are replaced by the power control bits.

In the exemplary embodiment, the reverse link power control bits are transmitted at a rate of 800 bps, or one power control bit for every 1.25 msec time slot. The time slot is called a power control group. Transmitting the power control bits at evenly spaced intervals can result in the base station sending out power control bits to multiple remote stations at the same time. This results in a peak in the amount of transmitted power. As a result, the power control bits are pseudo-randomly positioned within the 1.25 msec power control group. This is achieved by partitioning the 1.25 msec time slot into 24 positions and pseudo-randomly selecting, with a long PN sequence, the position in which to puncture in the power control bit. In the exemplary embodiment, only one of the first 16 positions within the power control group is selected as a starting position and the last 8 positions are not selected.

The forward traffic channel is a variable rate channel and the transmission power of the forward traffic channel is dependent on the data rate. The performance of the forward traffic channel is measured by the FER which is dependent on the energy-per-bit $E_b$ of the signal received at the remote station. At the lower data rates, the same energy-per-bit is spread over a longer time period, resulting in a lower transmission power level.

In the exemplary embodiment, transmissions over the forward link are made in accordance with TIA/EIA/IS95-A. The IS-95-A standard provides for transmission using one of two rate sets. Rate set 1 supports data rates of 9.6 kbps, 4.8 kbps, 2.4 kbps, and 1.2 kbps. The 9.6 kbps data rate is encoded with a rate 1/2 convolutional encoder to yield a 19.2 ksps symbol rate. The encoded data for the lower data rates are repeated N times to obtain the 19.2 ksps symbol rate. Rate set 2 supports data rates of 14.4 kbps, 7.2 kbps, 3.6 kbps, and 1.8 kbps. The 14.4 kbps data rate is encoded with a rate 1/2 convolutional encoder punctured to obtain a rate 3/4. Thus, the symbol rate is also 19.2 ksps for the 14.4 kbps data rate. The rate set is selected by the base station during the initiation stage of a call and typically remains in effect for the duration of the communication, although the rate set can be changed during the call. In the exemplary embodiment, the duration of the reverse link power control bit is two symbols wide (104.2 $\mu$sec) for rate set 1 and one symbol wide (52.1 $\mu$sec) for rate set 2.

In this specification, the transmission gain of the forward traffic channel refers to the energy-per-bit $E_b$(traffic) of the transmitted data signal. A frame with a lower data rate consists of fewer bits transmitted at the specified energy-per-bit, and therefore is transmitted with less power. In this way, the power level of the forward link traffic channel scales with the data rate of the frame currently being transmitted. The transmission gain of the reverse link power control bits refers to the energy-per-bit $E_b$(power control) of the reverse link power control bits punctured into the data stream. Each reverse link power control bit has the same duration, and therefore the power level of these bits does not depend on the data rate of the frame into which they are punctured. These characteristics of the power control bits are exploited by the present invention to provide the improved forward link power control mechanism. The operation of forward link power control causes the base station to make adjustments in the traffic channel gain. In the exemplary embodiment, each adjustment to the traffic channel gain is also applied to the gain of the reverse link power control bits, so that the two gains are adjusted together.

The present invention determines the quality of the forward link signal, as received by the remote station, by measuring the amplitude of the reverse link power control bits which are transmitted on the forward traffic channel. The quality of the data bits are not measured directly, but rather inferred from the measured amplitude of the reverse link power control bits. This is reasonable since the power control bits and the traffic data are equally affected by changes in the propagation environment. Therefore, the present invention operates well if the amplitude of the data bits is maintained at a known ratio to the amplitude of the power control bits.

Typically, the reverse link power control bits are transmitted at a low transmission power level. Furthermore, the power control bits can be transmitted from multiple base stations within the communication system. A more accurate measurement of the amplitude of the power control bits is obtained by receiving the power control bits, adjusting the phase and amplitude of the power control bits in accordance with the phase and amplitude of the pilot signal, and filtering the adjusted amplitude of the power control bits. The filtered amplitude of the power control bits are used to control the transmission power of the base station such that the quality of the forward link signal received at the remote station is maintained at the desired level.

The forward link power control mechanism of the present invention operates two power control loops. The first power control loop, the closed loop, adjusts the transmission power of the base station such that the quality of the filtered amplitude of the reverse link power control bits received at the remote station is maintained at a target energy level. In most situations, the target energy level is determinative of the FER of the forward traffic channel. The remote station requests the base station to adjust the forward link transmit power by sending forward link power control bits over the reverse link. Each forward link power control bit causes the base station to increase or decrease the gain of the corresponding traffic channel. The second power control loop, the outer loop, is the mechanism by which the remote station adjusts the target energy level in order to maintain the desired FER.

In order to improve the effectiveness of the forward link power control mechanism, e.g. to combat slow fading in the channel, the closed loop is designed to operate at a high rate. In the exemplary embodiment, the reverse link power control bits from which the quality measurements of the forward link signal are made are transmitted at 800 bps and the forward link power control bits are also sent on the reverse traffic channel at 800 bps. Thus, the transmission power of the base station can be adjusted at rates up to 800 times per second. However, because the forward power control bits are sent uncoded and with minimal energy, some forward power control bits may not be received satisfactorily at the base station. A base station may elect to ignore any forward power control bits which it considers to be sufficiently unreliable.

In the exemplary embodiment, the second forward link power control loop, the outer loop, updates the target energy level once every frame or 50 times per second. The outer loop sets the value of the target energy level which results in the desired FER performance. When the propagation environment is not changing, the outer loop should quickly determine the appropriate value of the target energy level and keep the target at that level. When there is a change in the channel characteristic (for example, an increase in the interference level, a change in velocity of a mobile user, or the appearance or disappearance of a signal path), it is likely that a different target energy level will be required in order to continue operation at the same FER. Therefore the outer loop should quickly move the target to the new level to adapt to the new conditions.

I. Circuit Description

Referring to the figures, FIG. 1 represents an exemplary communication system of the present invention which is composed of multiple base stations 4 in communication with multiple remote stations 6 (only one remote station 6 is shown for simplicity). System 2 controller 2 connects to all base stations 4 in the communication system and the public switched telephone network (PSTN) 8. System controller 2 coordinates the communication between users connected to PSTN 8 and users on remote stations 6. Data transmission from base station 4 to remote station 6 occurs on the forward link through signal paths 10 and transmission from remote station 6 to base station 4 occurs on the reverse link through signal paths 12. The signal path can be a straight path, such as signal path 10a, or a reflected path, such as signal paths 14. Reflected paths 14 is created when the signal transmitted from base station 4a is reflected off reflection source 16 and arrives at remote station 6 through a different path than the line of sight path. Although illustrated as a block in FIG. 1, reflection source 16 is the results of artifacts in the environment in which remote station 6 is operating, e.g. a building or other structures.

Figure 2:
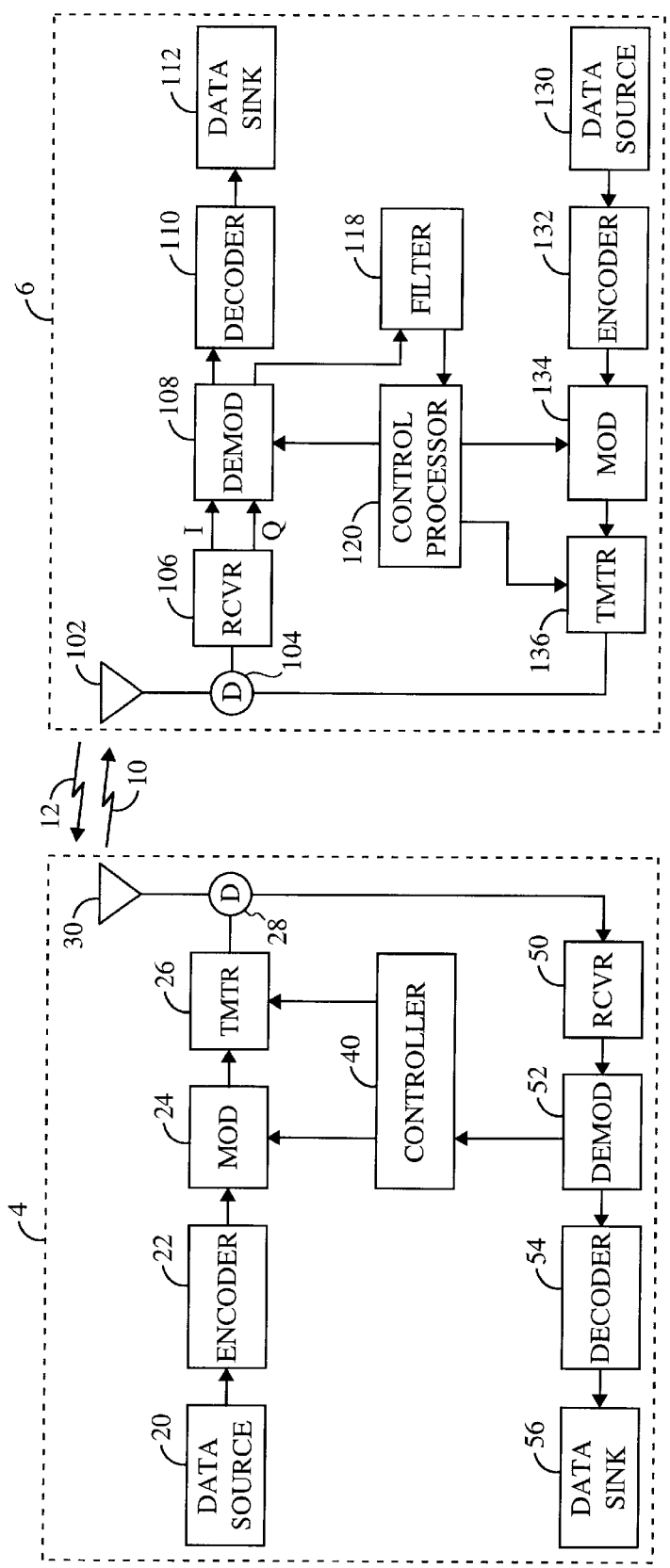
FIG. 2 is an exemplary block diagram of the base station and the remote station.
Figure 3:
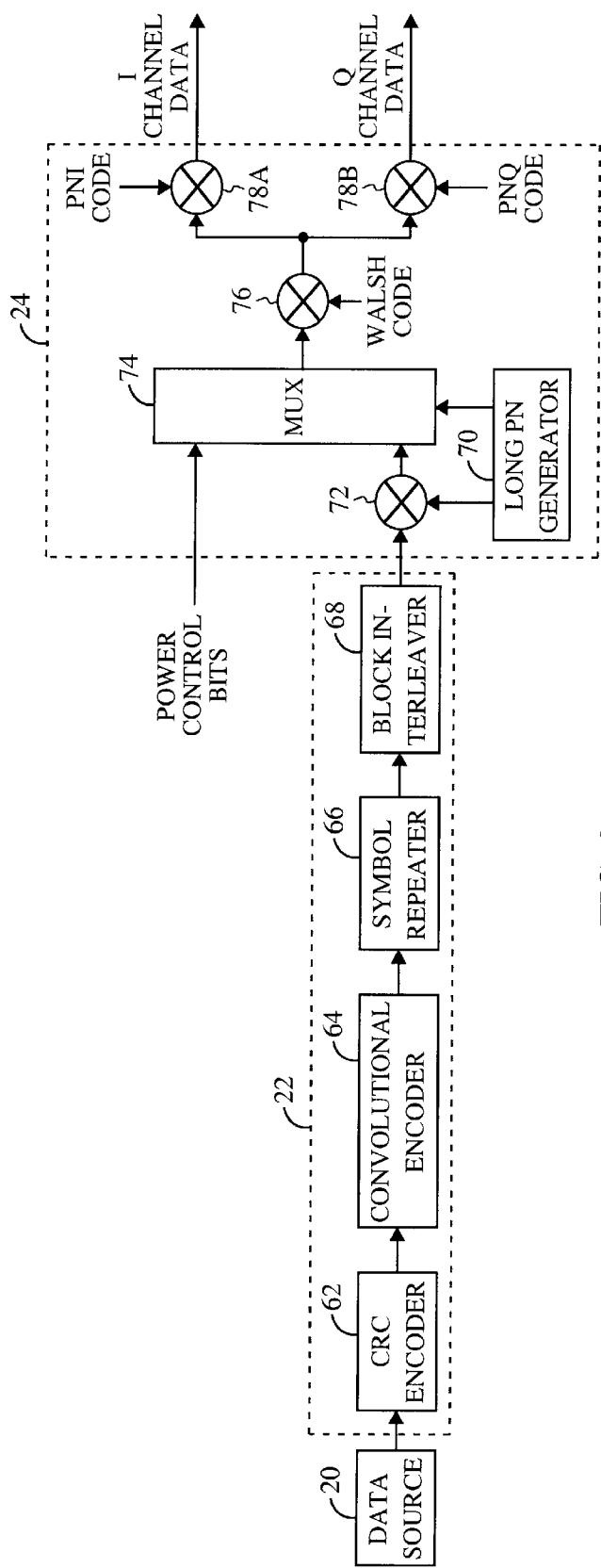
FIG. 3 is an exemplary block diagram of the forward traffic channel.

An exemplary block diagram of base station 4 and remote station 6 of the present invention is shown in FIG. 2. Data transmission on the forward link originates from data source 20 which provides the data to encoder 22. An exemplary block diagram of encoder 22 is shown in FIG. 3. Within encoder 22, CRC encoder 62 block encodes the data with a CRC polynomial which, in the exemplary embodiment, conforms to the CRC generator described in the IS-95-A standard. CRC encoder 62 appends the CRC bits and inserts a set of code tail bits to the data. The formatted data is provided to convolutional encoder 64 which convolutionally encodes the data and provides the encoded data to symbol repeater 66. Symbol repeater 66 repeats each symbol N, number of times to maintain a fixed symbol rate at the output of symbol repeater 66. The repeated symbols are provided to block interleaver 68. Block interleaver 68 reorders the symbols and provides the interleaved data to modulator (MOD) 24.

Within modulator 24, the interleaved data is spread by multiplier 72 with the long PN code which scrambles the data so that it can be received only by the receiving remote station 6. The long PN spread data is multiplexed through MUX 74 and provided to multiplier 76 which covers the data with the Walsh code corresponding to the traffic channel assigned to remote station 6. The Walsh covered data is further spread with the short PNI and PNQ codes by multipliers 78a and 78b, respectively. The short PN spread data is provided to transmitter (TMTR) 26 (see FIG. 2) which filters, modulates, upconverts, and amplifies the signal. The modulated signal is routed through duplexer 28 and transmitted from antenna 30 on the forward link through signal path 10. Duplexer 28 may not be used in some base station designs.

MUX 74 is used to puncture the reverse link power control bits into the data stream. The power control bits are one-bit messages which command remote station 6 to increase or decrease the reverse link transmission power. In the exemplary embodiment, one power control bit is punctured into the data stream in each 1.25 msec power control group. The duration of the reverse link power control bits is predetermined and can be made dependent on the rate set used by the system. The location at which the reverse link power control bit is punctured is determined by the long PN sequence from long PN generator 70. The output of MUX 74 contains both data bits and reverse link power control bits.

Referring to FIG. 2, at remote station 6, the forward link signal is received by antenna 102, routed through duplexer 104, and provided to receiver (RCVR) 106. Receiver 106 filters, amplifies, demodulates, and quantizes the signal to obtain the digitized I and Q baseband signals. The baseband signals are provided to demodulator (DEMOD) 108. Demodulator 108 despreads the baseband signals with the short PNI and PNQ codes, decovers the despread data with the Walsh code identical to the Walsh code used at base station 4, despreads the Walsh decovered data with the long PN code, and provides the demodulated data to decoder 110.

Figure 5:
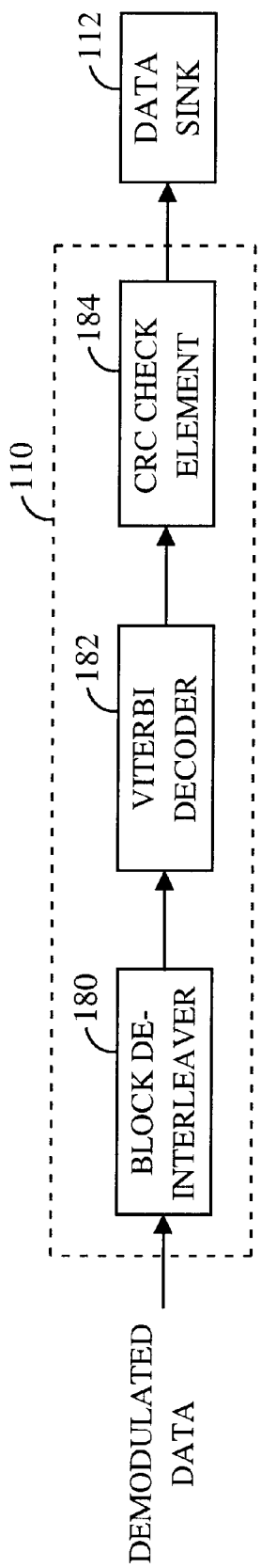
FIG. 5 is an exemplary block diagram of the decoder within the remote station.

Within decoder 110 which is shown in FIG. 5, block de-interleaver 180 reorders the symbols of the demodulated data and provides the de-interleaved data to Viterbi decoder 182. Viterbi decoder 182 decodes the convolutionally encoded data and provides the decoded data to CRC check element 184. CRC check element 184 performs the CRC check and provides the checked data to data sink 112.

II. Measurement of the Power Control Bits

Figure 4:
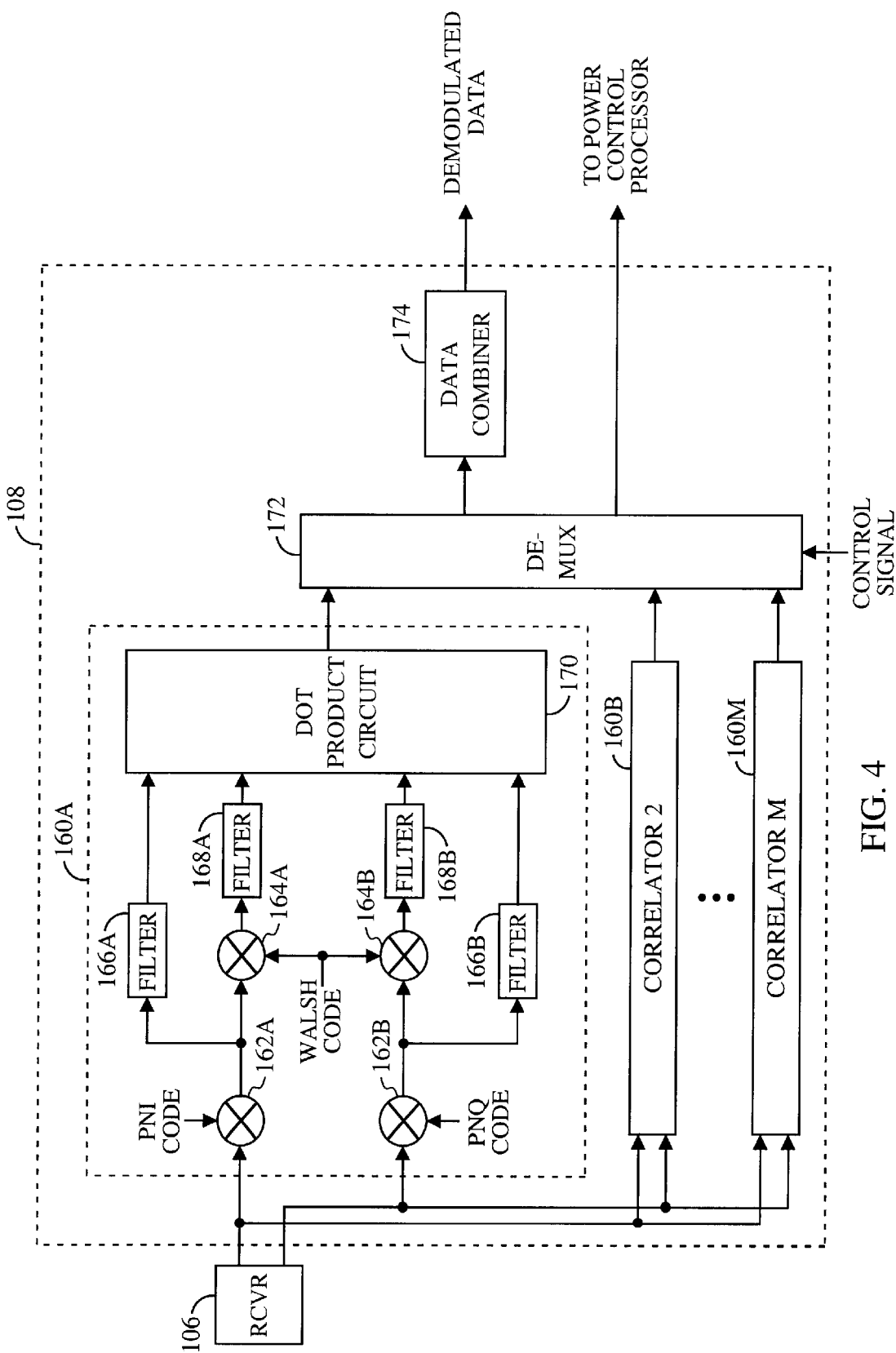
FIG. 4 is an exemplary block diagram of the demodulator within the remote station.

An exemplary block diagram illustrating the circuit for measuring the energy of the reverse link power control bits is shown in FIG. 4. The digitized I and Q baseband signals from receiver 106 are provided to a bank of correlators 160. Each correlator 160 can be assigned to a different signal path from the same base station 4 or a different transmission from a different base station 4. Within each assigned correlator 160, the baseband signals are despread with the short PNI and PNQ codes by multipliers 162. The short PNI and PNQ codes within each correlator 160 can have a unique offset in accordance with the base station 4 from which the signal was transmitted and corresponding to the propagation delay experienced by the signal being demodulated by that correlator 160. The short PN despread data is decovered by multipliers 164 with the Walsh code assigned to the traffic channel being received by the correlator 160. The decovered data is provided to filters 168 which accumulate the energy of the decovered data over a symbol time. The filtered data from filters 168 contains both data and power control bits.

The short PN despread data from multipliers 162 also contains the pilot signal. At base station 4, the pilot signal is covered with the all zero sequence corresponding to Walsh code 0. Thus, no Walsh decovering is necessary to obtain the pilot signal. The short PN despread data is provided to filters 166 which perform the lowpass filtering of the despread data to remove the signals from other orthogonal channels (e.g. the traffic channels, paging channels, and access channels) transmitted on the forward link by base station 4.

The two complex signals (or vectors) corresponding to the filtered pilot signal and the filtered data and power control bits are provided to dot product circuit 170 which computes the dot product of the two vectors in a manner well known in the art. The exemplary embodiment of dot product circuit 170 is described in detail in U.S. Pat. No. 5,506,865, entitled "PILOT CARRIER DOT PRODUCT CIRCUIT", assigned to the assignee of the present invention and incorporated by reference herein. Dot product circuit 170 projects the vector corresponding to the filtered data onto the vector corresponding to the filtered pilot signal, multiplies the amplitude of the vectors, and provides a signed scalar output $s_j(1)$ to demultiplexer (DEMUX) 172. The notation $s_j(m)$ is used to denote the output from the $m^{th}$ correlator 160m, during the $j^{th}$ symbol period. Remote station 6 has knowledge of whether the $j^{th}$ symbol period of the current frame corresponds to a data bit or a reverse link power control bit. Accordingly DEMUX 172 routes the vector of correlator outputs, $\underline{s}_j=(s_j(1), s_j(2), \ldots, s_j(M))$, to either data combiner 174 or power control processor 120. Data combiner 174 sums its vector inputs, despreads the data using the long PN code, and produces the demodulated data which is presented to decoder 110 shown in FIG. 5.

Figure 6:
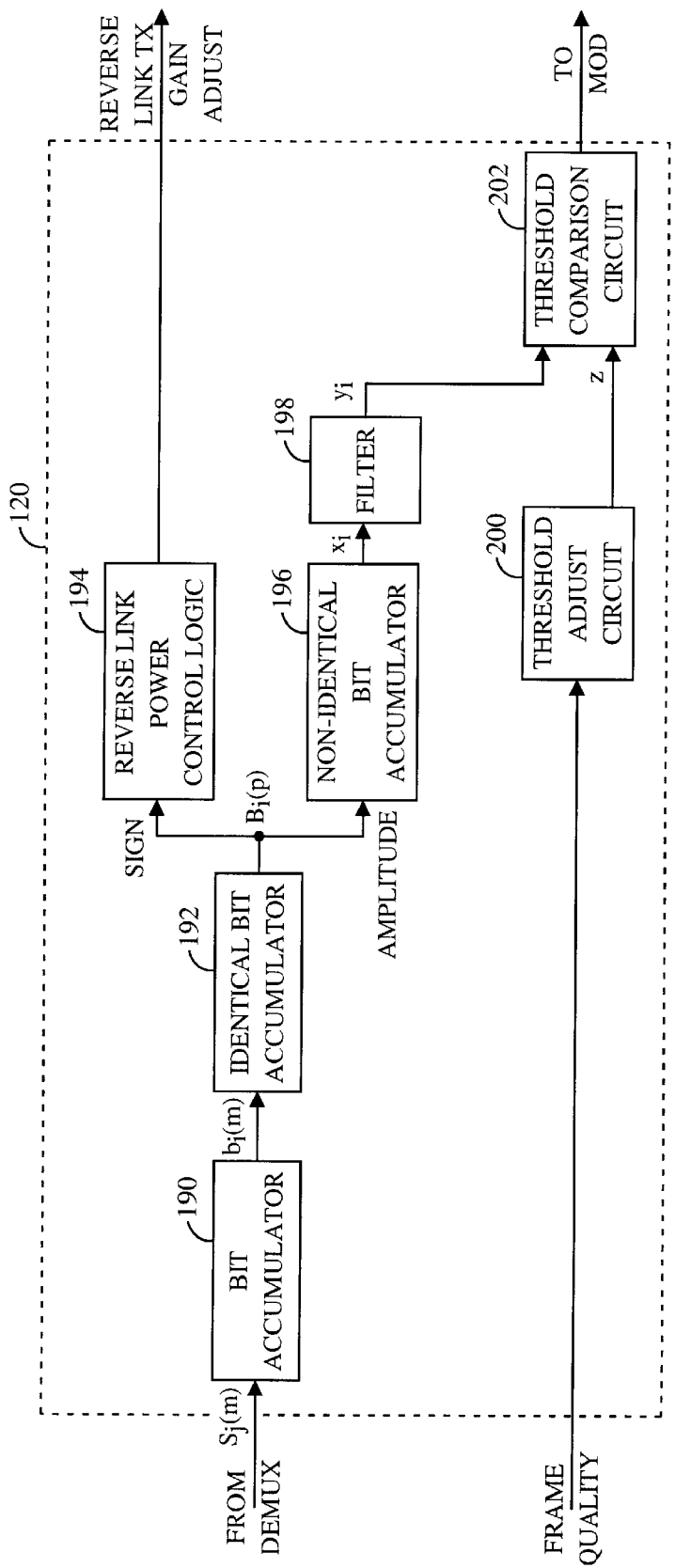
FIG. 6 is an exemplary block diagram of the power control processor within the remote station.

The reverse link power control bits are processed by power control processor 120, shown in detail in FIG. 6. Bit accumulator 190 accumulates one or more symbols $s_{j(m)}$ over the duration of a power control bit to form reverse link power control bits $b_i(m)$. The notation $b_i(m)$ is used to denote the reverse link power control bit corresponding to the $m^{th}$ correlator 160m, during the $i^{th}$ power control group. The vector of power control bits, $\underline{b}_i=(b_i(1), b_i(2), \ldots, b_i(M))$, is presented to identical bit accumulator 192.

In TIA/EIA/IS-95-A, when more than one base station 4 is in communication with the same remote station 6, the base stations 4 can be configured to transmit either identical or non-identical reverse link power control bits. Base stations 4 are typically configured to send identical power control bit values when they are physically located at the same location, such as when they are different sectors of a cell. Base stations 4 which do not send the same power control bit values are typically those which are physically located at different locations. The IS-95-A standard also specifies a mechanism by which base stations 4 which are configured to send identical power control bits are identified to remote station 6. Furthermore, when remote station 6 is receiving the transmission of a single base station 4 through multiple propagation paths, the reverse link power control bits received on these paths are inherently identical. Identical bit accumulator 192 combines the reverse link power control bits $b_i(m)$ which are known to be identical. The output of bit accumulator 192 is thus a vector of reverse link power control bits, $\underline{B}_i=(b_i(1), b_i(2), \ldots, b_i(P))$, corresponding to the P independent reverse link power control bit streams.

The vector of sign bits, $sgn(B_i(p))$, is presented to reverse link power control logic 194. The IS-95-A standard specifies that if any one of the signs is negative, remote station 6 decreases its transmission power level. If all the sign bits $sgn(B_i(p))$ are positive, remote station 6 increases its transmission power level. Reverse link power control logic 194 processes the vector of sign bits $sgn(B_i(p))$ as specified in IS-95-A. The output of reverse link power control logic 194 is a single bit which indicates whether remote station 6 should increase or decrease its transmission gain for the purposes of closed-loop reverse link power control. This bit is provided to transmitter 136 (see FIG. 2) which adjusts the gain accordingly.

The amplitude of the reverse link power control bits, and not their polarity (e.g. the positive or negative sign), is indicative of the signal quality as measured by remote station 6. Non-identical bit accumulator 196 therefore removes the modulated data and operates on the absolute value of the reverse link power control bits $|B_i(p)|$ which it combines according to the formula:

$$x_i = \frac{1}{P}\sum_{p=0}^{P-1} |B_i(p)|^\beta, \qquad (1)$$

where the factor $\beta$ specifies the order of non-linearity and P is the number of independent reverse link power control bit streams. In the exemplary embodiment, $\beta=1$ corresponds to a measurement of the absolute value of the amplitude of the power control bit and $\beta=2$ corresponds to measurement of the energy of the power control bit. Other values for $\beta$ can be used, depending on the system design, and are within the scope of the present invention. The output of non-identical bit accumulator 196 is the value $x_i$ which is indicative of the received energy-per-bit of the reverse link power control subchannel during the $i^{th}$ power control group.

The reverse link power control bits are not encoded and, therefore, are especially vulnerable to errors caused by interference. The fast response time of the closed loop reverse link power control minimizes the effect of such errors on the performance of the reverse link power control since these erroneous adjustments to the transmission gain of remote station 6 can be compensated for in subsequent power control groups. However, since the amplitude of the power control bits is used as an indication of the quality of the forward link signal, filter 198 is used to provide a more reliable measurement of the amplitude of the power control bits.

Filter 198 can be implemented using one of a number of designs known in the art, such as an analog filter or a digital filter. For example, filter 198 can be implemented as a finite impulse response (FIR) filter or an infinite impulse response (IIR) filter. Using a FIR filter implementation, the filtered power control bits can be calculated as:

$$y_i = \sum_{j=0}^{N-1} a_j \cdot x_{i-j}, \qquad (2)$$

where $x_i$ is the amplitude of the power control bit computed by non-identical bit accumulator 196 during the $i^{th}$ power control group, $a_j$ is the coefficient of the $j^{th}$ filter tap, and $y_i$ is the filtered amplitude of the power control bit from filter 198. Since delay is sought to be minimized, the coefficients of the FIR filter taps can be selected such that the larger coefficients of the FIR filter are those with smaller indices (e.g. $a_0 > a_1 > a_2 > \ldots$).

In the exemplary embodiment described herein, the processing performed by remote station 6 in order to execute fast forward link power control has been described in such a way as to share various components used by other subsystems within remote station 6. For example, correlator 160*a* is shared with the data demodulation subsystem, and accumulators 190 and 192 are shared with the reverse link power control subsystem. The practice of the present invention is not dependent on any particular implementation of the other subsystems of remote station 6. It should be obvious to those skilled in the art that other implementations to perform the forward power control processing as described herein can be contemplated and are, therefore, within the scope of the present invention.

III. Forward Link Power Control Outer Loop

The filtered amplitude yi of the reverse link power control bits from filter 198 is indicative of the quality of the forward link signal received at remote station 6. Threshold comparison circuit 202 compares the filtered amplitude $y_i$ against a target energy level z. In the exemplary embodiment, if $y_i$ exceeds z, remote station 6 transmits a zero ('0') bit on its forward link power control subchannel to indicate that each base station 4 which is transmitting a forward traffic channel to remote station 6 should reduce the gain of that traffic channel. Conversely, if $y_i$ is less than z, remote station 6 transmits a one ('1') bit on its forward link power control subchannel to indicate that each base station 4 should increase the gain on the forward traffic channel. These zeros ('0's) and ones ('1's) are the forward link power control bit values.

Although the present invention is described in the context of one forward link power control bit per power control group, the present invention is applicable toward the use of more bits for higher resolution. For example, threshold comparison circuit 202 can quantize the difference between the filtered amplitude $y_i$ of the reverse link power control bit and the target energy value z to multiple levels. For example, a two-bit message on the forward link power control subchannel can be used to indicate any one of four levels for the quantity ($y_i$–z). Alternatively, remote station 6 can transmit the value of the filtered amplitude $y_i$ over the forward link power control subchannel.

In the present invention, base station 4 does not have to adjust its transmission power at each power control group. Due to the low energy level of the reverse link power control bits, remote station 6 may receive the bits in error or with a large degradation due to the noise and interference from other users. Filter 198 improves the accuracy of the measurement but does not totally alleviate the error. In the exemplary embodiment, remote station 6 can omit the transmission of a forward link power control bit to base station 4 if it determines that the measurement is unreliable. For example, remote station 6 can compare the filtered amplitude $y_i$ against a minimal energy value. If $y_i$ is below the minimal energy value, remote station 6 can ignore the $y_i$ value for this power control group and inform base station 4 accordingly (e.g. by not transmitting a forward link power control bit to base station 4 or by using one value from a set of forward link power control values to indicate low received energy). Furthermore, the forward link power control bits are also transmitted at a low energy level. Therefore, base station 4 can also compare the measured forward link power control bit against its own minimal energy value and not act upon bits which fall below the minimal energy value.

In the exemplary embodiment, remote station 6 makes an absolute determination, based on the output of CRC check element 184 as well as other frame quality metrics such as the Yamamoto metric, and the number of re-encoded symbol errors, as to whether the frame has been correctly decoded. This determination is summarized in the erasure indicator bit (EIB) which is set to '1' to indicate a frame erasure, and set to '0' otherwise. In the following, it is assumed that remote station 6 makes use of an EIB in order to determine if received frames are in error. In the preferred embodiment, the EIB used for the purposes of controlling the outer loop of forward link power control is the same as the EIB actually transmitted over the reverse link. However, an independent determination of the validity of the received frame for the specific purpose of controlling the outer loop can also be made and is within the scope of the present invention.

In the exemplary embodiment, the outer loop is updated once per frame, or once in every 16 power control groups. The outer loop updates the target energy level z in remote station 6. This mechanism is performed by threshold adjust circuit 200 shown in FIG. 6. As each frame is decoded, frame quality information $e_i$, in the form of an EIB, is provided to threshold adjust circuit 200 as indicated in FIG. 6. Threshold adjust circuit 200 updates the value of the target energy level z and makes the new target energy level available to threshold comparison circuit 202.

In the first embodiment, threshold adjust circuit 200 updates the value of z according to the equation:

$$z_k = \begin{cases} z_{k-1} + \gamma & e_{k-1} = 1 \\ z_{k-1} - \delta & e_{k-1} = 0 \end{cases}, \quad (3)$$

where $z_k$ is the target energy level at the $k^{th}$ frame, $e_{k-1}$ is the frame error at the $(k-1)^{th}$ frame, $\gamma$ is the size of an upward step to be applied to the target energy level, and $\delta$ is a size of a downward to be applied to the target energy level. In the exemplary embodiment, $e_{k-1}$ is set equal to 1 if there was a frame error for the $(k-1)^{th}$ data frame and 0 otherwise. The values for $\gamma$ and $\delta$ are selected to provide a desired level for the FER. Typically, $\gamma$ is large and $\delta$ is small. This selection creates a sawtooth-like pattern for $z_k$. When a frame error occurs, $z_k$ increases substantially to minimize the probability of another frame error. When there is no frame error, $z_k$ slowly decays to minimize the transmission power. In the exemplary embodiment, the values for $z_k$, $\gamma$ and $\delta$ are in dB scale, although a linear scale for these variables can also be used.

In the second embodiment, the stepsizes $\gamma$ and $\delta$ can be made functions of the current target energy level $z_{k-1}$ so that the correction to $z_k$ is dependent on the current target energy level. Thus, equation (3) can be modified as:

$$z_k = \begin{cases} z_{k-1} + \gamma(z_{k-1}) & e_{k-1} = 1 \\ z_{k-1} - \delta(z_{k-1}) & e_{k-1} = 0 \end{cases}. \quad (4)$$

In the exemplary embodiment, remote station 6 completes demodulation of the data frame and updates the target energy level $z_k$ during the middle of the succeeding frame. If the $(k-1)^{th}$ data frame is received in error, the probability of a frame error for the $k^{th}$ data frame is greater. This is because any adjustment to the target energy level will not have an immediate impact on the FER performance until the system has had sufficient time to make a transition to the new operating point. Therefore, the second of two consecutive frame errors should not be interpreted as indicative of the performance of the target energy level value which was just updated as a result of the first frame error.

In the preferred embodiment, base station 4 increases the gain of the traffic channel fully after the first frame error, then ignores a second frame error if it occurs in the following frame. Applying this concept to the second embodiment described above, equation (4) becomes:

$$z_k = \begin{cases} z_{k-1} + \gamma(z_{k-1}) & e_{k-1} = 1, e_{k-2} = 0 \\ z_{k-1} & e_{k-1} = 1, e_{k-2} = 1 \\ z_{k-1} - \delta(z_{k-1}) & e_{k-1} = 0 \end{cases}. \quad (5)$$

In the exemplary embodiment, the outer loop power control mechanism is standardized across all remote stations 6 to ensure conformance by all remote stations 6. The values of $\gamma$ and $\delta$ can be transmitted to each remote station 6 by base station 4 during the initiation stage of a call. New values for these parameters can also be specified by base station 4 during the course of the call.

In a communication system which conforms to the IS-95-A standard, the gains of the forward traffic channels are typically decreased when remote station 6 enters soft handoff. This is done without any degradation in the FER performance since the data bits received at remote station 6 from the base stations 4 are combined to yield a larger composite signal before decoding. However, the reverse link power control loop within remote station 6 does not combine the reverse link power control bits received from different base stations 4 since these bits are independent. The decrease in the gain on the forward traffic channel can increase the bit error rate of the power control bit stream transmitted on the forward traffic channel, and therefore degrade the reverse link power control mechanism. To remedy this situation, the gain of the power control bits is typically boosted when remote station 6 enters soft handoff. This results in the gain of the reverse link power control bits being slightly higher than the gain of the data bits whenever remote station 6 is in soft handoff.

In the present invention, the absolute values of the power control bits from different base stations 4 are combined according to equation (2). Thus, the boost in the gain of the power control bits results in larger values for $y_i$ relative to the data bits. The larger $y_i$ values cause remote station 6 to request an inappropriate decrease in transmission power from base station 4 which can result in one or more frame errors on the forward traffic channel. In this case, the target energy value z set by the outer loop automatically increases. After a while, the outer loop then adjusts the target energy value z to the new nominal value. To combat these effects, $y_i$ can be scaled before comparison with the target energy level z. Alternatively, the target energy level z can be slightly increased when remote station 6 enters soft handoff. This can reduce the likelihood of these errors.

In the present invention, the comparison of the filtered amplitude $y_i$ to the target energy level z is performed within power control processor 120 (see FIG. 2). Furthermore, the update of the target energy level in accordance with equation (3), (4) or (5) is also performed within power control processor 120. Controller processor 120 can be implemented in a microcontroller, a microprocessor, a digital signal processing (DSP) chip, or an ASIC programmed to perform the function as described herein.

IV. Transmission of the Forward Link Power Control Bits

The forward link power control bits can be transmitted to base station 4 by one of several methods. In the exemplary embodiment, each remote station 6 has a forward link power control channel on the reverse link which is dedicated for the transmission of the forward link power control bits. In the alternative embodiment, wherein the dedicated power control channel is not available, the forward link power control bits can be punctured or multiplexed onto the reverse link data bit stream in a manner similar to that done on the forward traffic channel.

In the exemplary embodiment, the forward link power control bits are transmitted to base station 4 on a dedicated forward link power control channel. A method and apparatus for providing a dedicated forward link power control channel is described in detail in the aforementioned U.S. Pat. No. 5,930,230. Timing diagrams of the transmission of the forward and reverse link power control bits are shown is FIG. 7. In each power control group, delineated by the heavy hashmarks on the timelines, a reverse link power control bit is transmitted on the forward traffic channel, as depicted in the top diagram of FIG. 7. In the exemplary embodiment, one reverse link power control bit is transmitted in each 1.25 msec power control group and each reverse link power control bit is two symbols in duration for rate set 1. Furthermore, each reverse link power control bit can start from one of 16 positions within the power control group, depending on the long PN sequence.

Remote station 6 processes the reverse link power control bit and transmits a forward link power control bit on the reverse power control channel to base station 4 as a pulse. In the exemplary embodiment, the pulse is sent with positive polarity to indicate a forward link power control bit with value zero ('0') and with negative polarity to indicate a the value one ('1'). The timing and duration of the pulses are design parameters which are described in the following embodiments. Other choices for these parameters can be contemplated and are within the scope of the present invention.

In the first embodiment, the forward link power control bits are transmitted as pulses of length 1.25 msec, beginning at 0.625 msec after the last possible (i.e. the $16^{th}$) power control bit position on the forward traffic channel. This configuration is illustrated in the middle diagram of FIG. 7, wherein the parameter "delay1" is set to 0.625 msec. A delay of 0.625 msec allows some time for remote station 6 to deskew the paths of the forward link signal in a worst-case scenario. The deskewing properly aligns the signals from different signal paths before combining and ensures that the reverse link power control bit from the previous power control group are processed by the time the forward link power control bit is transmitted. However, the actual delay from the reception of the reverse link power control bit to the transmittal of the forward link power control bit can be as large as 1.45 msec when the reverse link power control bit is transmitted in the earliest possible bit position.

In the second embodiment, the forward link power control bits are transmitted as pulses of length 1.25 msec, beginning at approximately 0.050 msec after the latest possible (i.e. the $16^{th}$) power control bit position on the forward traffic channel. This configuration is identical to the first embodiment, except that the parameter "delay1" is set to 0.050 msec. In the worst-case scenario, the reverse link power control bit from the previous power control group will not have been processed, due to deskewing delays, by the time the next forward link power control bit is scheduled to be transmitted. In this situation, remote station 6 can be configured to repeat the latest forward link power control bit. However, deskewing delays are typically in the tens of psec so, in the majority of cases, the forward link power control bit will still be able to take into account the processing of the most recent reverse link power control bit. It should be evident that the parameter "delay1" can be chosen to optimize the performance of the system.

Figure 7:
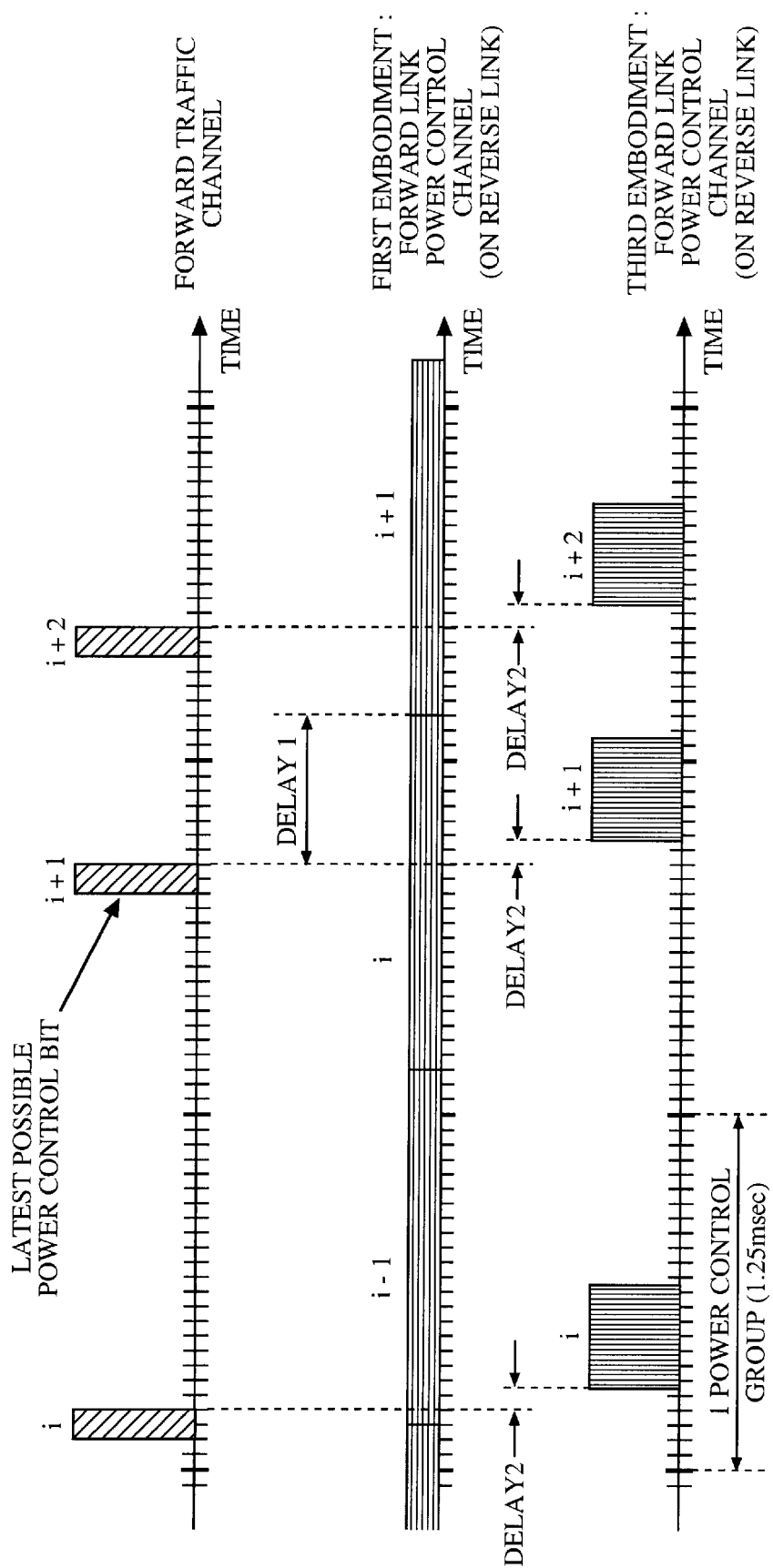
FIG. 7 is a timing diagram of the forward and reverse link power control channels.

In a third embodiment, shown in the bottom diagram of FIG. 7, the forward link power control bit is transmitted as a short pulse of approximately 0.41 msec in duration at a predetermined amount of time ("delay2" in FIG. 7) after reception of the reverse link power control bit on the forward traffic channel. The duration of the forward link power control bit is chosen to be small enough so that it will be finished by the time the following forward link power control bit is to be sent, even in the worst case when the latest possible time slot is used in the current power control group and the earliest possible time slot is to be used in the following power control group. In the exemplary embodiment, the amount of delay is set to 0.050 msec (delay2=0.050 msec). As illustrated in FIG. 7, this embodiment entails higher transmission power for the duration of the pulse in order to transmit the same amount of energy over a shorter pulse duration. One drawback of this method is that the transmission of large amounts of energy within short pulses at 800 Hz can potentially cause interference in the audio band to persons with hearing aids. However, since remote station 6 transmits the forward link power control bits a fixed amount of time after the reverse link power control bits and the reverse link power control bits are randomly positioned, the forward link power control bits are also randomly positioned. Randomizing the starting position of the power control bits spectrally distributes the energy at 800 Hz and minimizes the audio interference. Furthermore, the forward link power control channel sent on the reverse link from remote station 6 is one of many data streams transmitted on the reverse link. Since the power in the bit is low, the net variation in the output power of remote station 6 due to the power control bits is small.

Finally, in a fourth embodiment, the forward link power control bit is transmitted after a fixed amount of time, delay2 =0.050 msec, following the reception of a reverse link power control bit. In this embodiment, however, the duration of the forward link power control bit is variable, and transmission of the current forward link power control bit is continued until the next forward link power control bit is scheduled. Remote station 6 can send each forward link power control bit with the same gain or it can adjust the transmit gain based on the duration of the bit in order to send each bit with the same amount of energy.

Referring to FIG. 2, the forward link power control bits are processed by power control processor 120 within remote station 6. Power control processor 120 computes the forward link power control bits which are sent on the reverse link and sends the bits to modulator (MOD) 134. Modulator 134 covers the bits with the Walsh code corresponding to the reverse power control channel, spreads the covered data with the long and short PN codes, and provides the spread data to transmitter (TMTR) 136. Transmitter 136 can be implemented as described in the aforementioned U.S. Pat. No. 5,930,230. Transmitter 136 filters, modulates, and amplifies the signal. The modulated signal is routed through duplexer 104 and transmitted from antenna 102 on the reverse link through signal path 12.

At base station 4, the reverse link signal is received by antenna 30, routed through duplexer 28, and provided to receiver (RCVR) 50. Receiver 50 filters, amplifies, and downconverts the signal to obtain the baseband signals. The baseband signals are provided to demodulator (DEMOD) 52. Demodulator 52 despreads the baseband signals with the short PN codes, decovers the despread data with the Walsh code identical to the Walsh code used at remote station 6, and provides the demodulated data to controller 40. The demodulated data includes the forward link power control bits. Controller 40 can adjust the gain of the forward traffic channel and/or the transmission power of base station 4 as indicated by the forward link power control bits.

V. Base Station Response

In the present invention, base station 4 receives the forward link power control bits which are transmitted on the reverse power control channel and controls the gain of the forward traffic channel. In the exemplary embodiment, upon receipt of a one ('1') for the forward link power control bit, base station 4 increases the gain of the forward traffic channel. Upon receipt of a zero ('0'), base station 4 decreases the gain. The amount of increase or decrease in the gain is dependent on the implementation and system considerations. In the exemplary embodiment, the increase or decrease in gain can be in steps of 0.5 dB to 1.0 dB, although other step sizes can be utilized. The step size for the gain increase can be the same or different from the step size for the gain decrease. Furthermore, the step size in gain can be made dependent on the gains of other forward traffic channels at base station 4. The present invention is applicable to all step sizes in gain adjustment.

Base station 4 can also adjust the increase in gain, the decrease in gain, or both as a function of the velocity and the fading conditions of remote station 6. Base station 4 does this since the optimal step size is a function of the fading conditions and the velocity of remote station 6. For example, at very high velocities, smaller step sizes may work better since the rate of the power control bit is not fast enough to follow the rapid fading. Since the forward link interleaver averages the fading, large power control step sizes just tend to add amplitude jitter to the forward link waveform. However, fast power control is needed to dynamically adjust the average waveform to the correct level. Demodulator 52 within base station 4 can estimate the fading conditions and the velocity of remote station 6. Searcher elements in demodulator 52 can determine the number of multipath components currently being received and compute their profile. These searcher elements are described in U.S. Pat. No. 5,109,390, entitled "DIVERSITY RECEIVER IN A CDMA CELLULAR TELEPHONE SYSTEM" and U.S. patent application Ser. No. 08/316,177, entitled "MULTIPATH SEARCH PROCESSOR FOR A SPREAD SPECTRUM MULTIPLE ACCESS COMMUNICATION SYSTEM", filed Sep. 30, 1994, both are assigned to the assignee of the present invention and incorporated by reference herein.

Demodulator 52 can also estimate the velocity of remote station 6 by estimating the reverse link frequency error using demodulation techniques which are well known in the art. The frequency error is approximately $2 \cdot f_c \cdot v/c + \epsilon$ where $f_c$ is the operating frequency, v is the velocity of remote station 6, c is the speed of light, and $\epsilon$ is the residual frequency error of remote station 6. In conformance with TIA/EIA/IS-95-A, remote station 6 measures the frequency which is received on the forward link and uses this to set the transmit frequency on the reverse link. A discussion of the setting the transmit frequency based on the measured received frequency is disclosed in U.S. Pat. No. 5,822,218, entitled "METHOD AND APPARATUS FOR CONTROLLING POWER IN A VARIABLE RATE COMMUNICATION SYSTEM", filed Jul. 29, 1994, assigned to the assignee of the present invention and incorporated by reference herein. Remote station 6 does this to remove the error from its own oscillator. This process results in a doubling of the Doppler frequency error of the signal received at base station 4 as there is a frequency error of $f_c \cdot v/c$ on the forward link and a frequency error of $f_c \cdot v/c$ on the reverse link. The error in setting the transmit frequency in remote station 6 from the received frequency is $\epsilon$. For a high velocity mobile, the error $\epsilon$ is relatively small. Thus, demodulator 52 can provide velocity and multipath estimates to controller 40 which then uses these information to determine the gain increase and decrease and the step sizes.

Base station 4 has a maximum transmission power that is determined by the system design constraints and FCC regulations. Inevitably, base station 4 will experience a situation in which it does not have enough available power when remote station 6 requests a gain increase. If base station 4 limits or ignores the gain increase command because of inadequate transmission power, the FER for the forward traffic channel can increase. When this occurs, the target energy level at remote station 6 can increase substantially and quickly. This is due to the fact that the upward step γ in equation (5) is typically large relative to the downward step δ. If the poor channel condition disappears or base station 4 is able to transmit additional power to remote station 6, the time it takes the target energy level z to settle to the proper range can be long since the downward step δ is typically small. In the preferred embodiment, base station 4 transmits new values for the upward step γ and the downward step δ during the time when the FER on the forward link is higher than nominal.

In the present invention, the FER performance of the forward traffic channel is related to the target energy level z. Thus, base station 4 can directly adjust the target energy level z to obtain the desired FER. For example, if base station 4 realizes that the system is highly loaded and one or more remote stations 6 need to operate at higher FERs, base station 4 can alter the target energy levels of these remote stations 6 by transmitting the new target energy levels z to the remote stations 6. Alternatively, base station 4 can manipulate the target energy levels by commanding these remote stations 6 to use the new upward steps γ and downward steps δ. In the exemplary embodiment, whenever base station 4 is not able to respond to the power control command from remote station 6, base station 4 adjusts the target energy level, or upward and downward steps, to prevent the power control loop from hitting the maximum transmission power and operating in the non-linear region.

To ensure that the forward link power control mechanism works properly and that no remote station 6 requests more or less transmission power than necessary for the requisite level of performance, base station 4 can monitor the FER of the forward traffic channel. In the exemplary embodiment, remote station 6 transmits an error message to base station 4 whenever a data frame is received in error. This error message can be the erasure indicator bit (EIB) described previously. Base station 4 can monitor the error messages from remote station 6, calculate the FER, and manipulate the target energy level z of remote station 6 by assigning remote station 6 the proper values for the upward step γ and the downward step δ.

VI. Gain Correction Mechanism

The forward link power control mechanism of the present invention performs better when delays are minimized. In order to compensate for fading of the forward traffic channel, base station 4 should apply the increase or decrease in transmission power, as requested by remote station 6, as soon as possible. When remote station 6 is not in soft handoff, the forward link power control bits are received by a single base station 4 which adjusts the gain of the forward traffic channel in response to the forward link power control bit. A remote station 6 in softer handoff communicates with multiple sectors simultaneously. In the exemplary embodiment, a single channel element in one base station 4 is used to control the communication between remote station 6 and all sectors in softer handoff. Therefore, base station 4 can quickly adjust the transmission power of all sectors upon reception of the forward link power control bit from remote station 6.

A remote station 6 in soft handoff can communicate with multiple base stations 4 simultaneously. The method and apparatus for performing distributed forward link power control is described in detail in the aforementioned U.S. Pat. No. 5,893,035. Some base stations 4 may not receive the forward link power control bit stream or may not receive the power control bit stream with sufficient reliability. In the present invention, a forward link power control correction mechanism is used to ensure that the gains of the forward traffic channels of all base stations 4 in the active member set of remote station 6 are set properly and that erroneous reception of forward link power control bits by the base stations 4 do not accumulate. In the exemplary embodiment, when remote station 6 is in soft handoff, the gain of the forward traffic channel of the base station 4 which receives the reverse link signal the strongest is used by all base stations 4 in the active member set. The power control correction mechanism can be accomplished by the following embodiments.

In the first embodiment, to ensure that gains of the forward traffic channels are approximately equal for all base stations 4 in communication with remote station 4, the selected forward link power control bit stream is provided to all base stations 4. For each frame, all base stations 4 in the active member set send the forward link power control bits which were received by the base stations 4 to a selector within system controller 2. The selector selects the power control bits from the base station 4 which receives the reverse link signal the strongest. The selected power control bits from this base station 4 is then provided to all base stations 4 in the active member set. Each base station 4 receives the selected forward link power control bits from the selector, compares the selected bits with the bits that it actually received and processed, and readjusts the gains on the forward traffic channels to conform with the selected forward link power control bits.

Base stations 4 can send the power control bits to the selector within controller 40 in backhaul frames. The backhaul frame selection can be done in accordance with existing procedures used in TIA/EIA/IS-95-A systems. After processing, the selector can send the selected forward link power control bits to all base stations 4 in backhaul frames carrying user traffic for transmission to remote station 6.

In the second embodiment, each base station 4 sends the gain of the forward traffic channel to the selector at every frame. The selector selects the gain corresponding to the base station 4 which received the reverse link signal the strongest. The selector sends the selected gain to all base stations 4 in the active member set and the base stations 4 update their gains accordingly. The selected gain is just the gain value sent from the selector to base stations 4 in existing TIA/EIA/IS-95-A systems. This gain value is carried on backhaul formats which are sent on interface A3 as specified in the TIA/EIA/IS-634-A standard which is incorporated by reference herein.

Due to processing delays, the update of the gains of the forward traffic channels requires some care. In the exemplary embodiment, each base station 4 can adjust the gain of its forward traffic channel based on its measurement of the forward link power control bits from remote station 6. However, the selector may determine that the power control bits received by another base station 4 should be used. This decision is usually not made until a predetermined amount of time after the base stations 4 have applied their own measurements of the forward link power control bits. Therefore, the base stations 4 need to adjust the gains of their forward traffic channels in accordance with the power control bits the base stations 4 actually received and the selected power control bits from the selector. The base stations 4 also need to account for the delay between the original gain adjustments and the receipt of the selected power control bits from the selector.

In the exemplary embodiment, each base station 4 stores the gains that were used by that base station 4 at each update period. The selector sends the selected power control bit (or the selected gain) of the base station 4 which was determined to be the most likely to have received the power control bit correctly. Each base station 4 then compares the gains that were stored at the update period to that which was received from the selector and updates the gain at the current time slot by the difference. The gain $G_i$ for the $i^{th}$ power control bit is thus:

$$G_i = G_{i-1} + \upsilon(2b_i - 1) + (G_{M\lfloor(i-M)/M\rfloor+p} - H_{M\lfloor i/M\rfloor}) \cdot \delta_{(M\lfloor i/M\rfloor+q)i},  \quad (6)$$

where $G_i$ is the gain during the $i^{th}$ time slot, $b_i$ is the value (one or zero) of the $i^{th}$ power control bit, $\upsilon$ is the gain step size, M is the number of power control bits per frame, p is the offset in time slots from the start of a frame to the time the power control bits are sent from base station 4 to the selector ($0 \leq p \leq M-1$), $H_k$ is gain of the forward traffic channel specified by the selector during the $k^{th}$ frame where $k = \lfloor i/M \rfloor$, q is the offset in time slots from the start of a frame to the time the updated gain is received at base station 4 from the selector ($0 \leq q \leq M-1$), and $\delta_{ij}$ equals 1 if i=j and 0 otherwise. In the exemplary embodiment, M is equal to 16 although other values of M can be used and are within the scope of the present invention.

Figure 8:
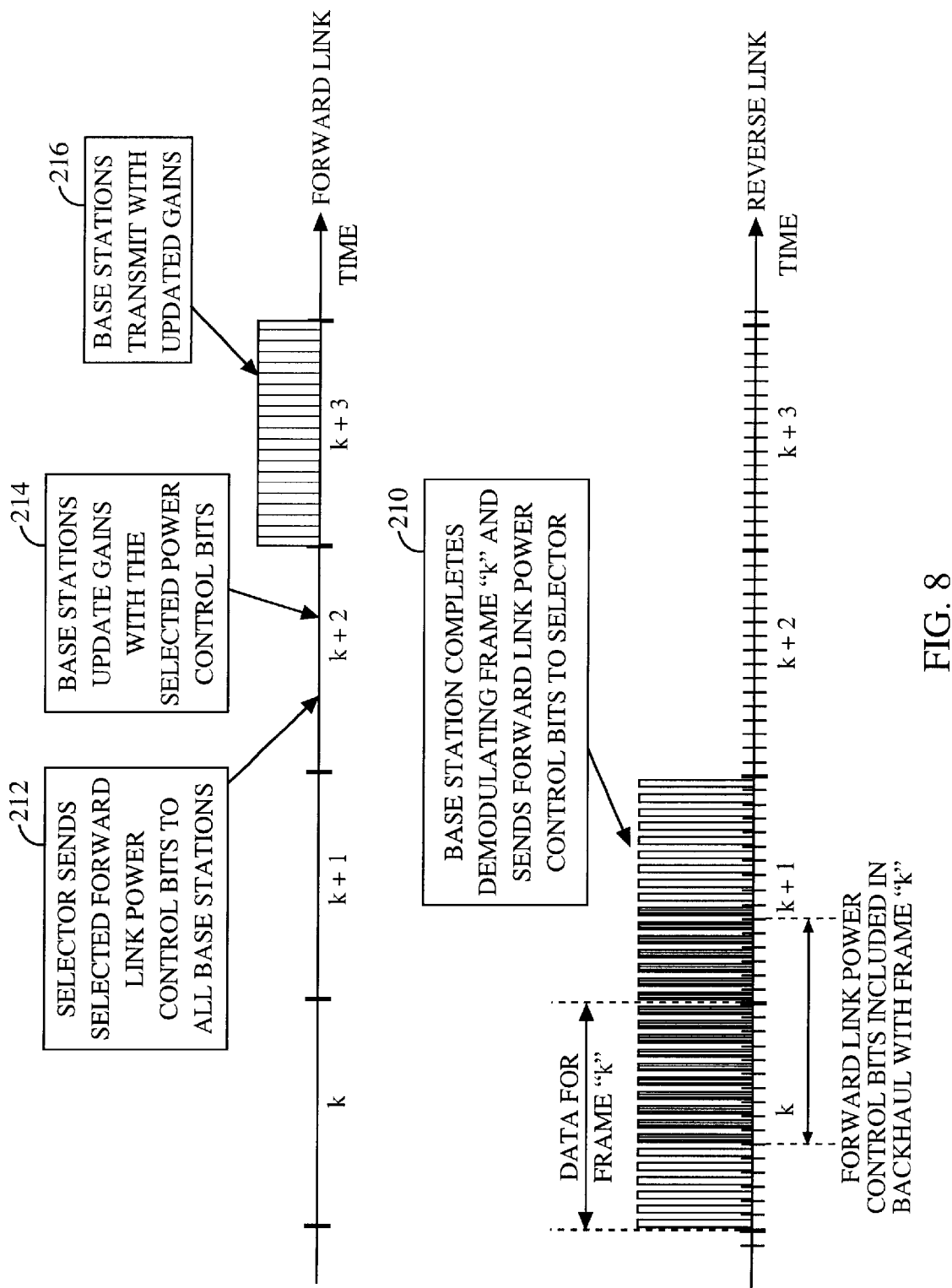
FIG. 8 is a timing diagram of the gain correction mechanism within the forward link power control loop.

An exemplary timing diagram of the forward link power control correction mechanism is shown in FIG. 8. Forward traffic channel frames and reverse link data frames are almost exactly aligned in time, skewed only by the over-the-air propagation delay. Frames (of duration of 20 msec) are indexed as k, k+1, k+2, and k+3, and delineated by thick hashmarks in FIG. 8. Frame k of the reverse link data stream is received at base station 4 and, after some processing delay, is decoded some time during frame k+1, as indicated by block 210. Meanwhile, base station 4 is also processing forward link power control commands with considerably less processing delay. Thus the shaded forward link power control bits in the lower timeline of FIG. 8 depict the 20 msec block of forward link power control bits which is sent to the selector in the same backhaul frame along with frame k of the reverse link data stream. During frame k+2, the selector selects the forward link power control bits from the base station 4 which received the strongest reverse link signal and sends these selected power control bits to all base stations 4 in the active member set of remote station 6, at block 212. Typically, the selected power control bits are sent in a backhaul frame. Shortly thereafter, also within frame k+2, the base stations 4 receive the selected power control bits from the selector and correct the gains of the forward traffic channels in accordance with the selected power control bits in the manner described above, at block 214. By the beginning of frame k+3, the base stations 4 transmit with the updated gains, as indicated by block 216.

The above example shows three frames of processing delay from the time remote station 6 transmits the forward link power control bits to the time the base stations 4 corrects the gains of the forward traffic channels. However, in the exemplary embodiment, each base station 4 can adjust the gain of its forward traffic channel in response to its measurement of the forward link power control bit. In this way, each base station 4 can rapidly adjust the gain of its forward traffic channel on its own and the processing delay is minimized. The forward link power control correction mechanism, wherein the power control bits from the base station 4 which measures the reverse link signal the strongest are used to correct the gains of the forward traffic channels of other base stations 4 in the active member set, ensures that the erroneous reception of power control bits by the base stations 4 do not accumulate. Other embodiments to ensure correct operations of the forward link power control mechanism by all base stations 4 can be contemplated and are within the scope of the present invention.

Although the present invention is described in terms of the forward link power control mechanism, the inventive concept disclosed herein is also applicable for the reverse link power control.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for controlling a forward link transmission power in a CDMA system comprising:
   measuring amplitude values of a first set of bits received over the forward link, wherein each bit of the first set of bits is transmitted at a transmit power level that is independent of a forward link data rate;
   comparing said amplitude values against a target energy level; and
   generating a second set of bits based on said comparing, wherein said second set of bits is used to adjust the forward link transmission power.

2. The method of claim 1 wherein said target energy level is set at an initial stage of a communication and/or in response to a measured performance of a received signal.

3. The method of claim 1 further comprising the step of:
   transmitting said second set of bits to a destination station;
   wherein said transmission power of said destination station is adjusted in accordance with said second set of bits.

4. The method of claim 3 wherein each bit of said second set of bits is transmitted after a fixed delay from a latest possible power control bit position of said first set of bits.

5. The method of claim 3 wherein each bit of said second set of bits is transmitted after a fixed delay from a received bit of said first set of bits.

6. The method of claim 3 wherein each bit of said second set of bits is transmitted with a pulse having a duration of less than one power control group.

7. The method of claim 1 further comprising the step of:
   adjusting said target energy level in response to a measured performance of a received signal.

8. The method of claim 7 wherein said adjusting step comprises the steps of:
   increasing said target energy level by an upward step in response to an indication of a frame error; and
   decreasing said target energy level by a downward step in response to an absence of a frame error.

9. The method of claim 8 wherein said adjusting step further comprises the step of:
   maintaining said target energy level if said amplitude values of said first set of bits fall below a minimal energy level.

10. The method of claim 8 wherein said upward step and said downward step are set at an initial stage of a communication and/or in response to said measured performance of said received signal.

11. The method of claim 8 wherein said upward step and said downward step are functions of said target energy level.

12. The method of claim 8 wherein said adjusting step further comprises the step of:
    maintaining said target energy level in response to an indication of two consecutive frame errors; and
    wherein said increasing step is in response to an indication of a frame error and an absence of a frame error in two consecutive prior data frames.

13. The method of claim 1 further comprising the step of:
    correcting said transmission power in accordance with a set of commands from a system controller.

14. The method of claim 5 wherein said correcting step comprises the steps of:
    receiving at least one set of said second set of bits; and
    selecting a selected set of bits from among said at least one set of said second set of bits;
    wherein said transmission power is corrected in accordance with said selected set of bits.

15. The method of claim 1 wherein said measuring step further comprises the steps of:
    receiving at least one signal path corresponding to said first set of bits;
    demodulating each of said at least one signal path to obtain a pilot signal and a filtered data;
    computing a dot product of said pilot signal and said filtered data to obtain a signed scalar output; and
    combining said signed scalar outputs from said least one signal path to obtain a combined scalar output;
    wherein said amplitude values of said first set of bits is equal to said combined scalar output.

16. The method of claim 15 further comprising the step of:
    filtering said combined scalar output to obtain said amplitude values of said first set of bits.

17. The method of claim 15 wherein said combining step comprises the steps of:
    coherently summing said signed scalar outputs from said at least one signal path which carry an identical stream of said first set of bits; and
    summing said absolute values of said signed scalar outputs from said at least one signal path which carry a non-identical stream of said first set of bits.

18. An apparatus for controlling a forward link transmission power in a CDMA system comprising:
    a first power control loop for maintaining a quality of a received signal at a target energy level, said first power control loop receiving a first set of bits and a target energy level and providing a second set of bits in response to said first set of bits and said target energy level, wherein each bit of the first set of bits is transmitted at a transmit power level that is independent of a forward link data rate; and
    a second power control loop for maintaining a measured performance of said received signal, said second power control loop receiving indicators of frame errors and a performance threshold and providing said target energy level to said first power control loop in response to said measured performance and said performance threshold.

19. The apparatus of claim 18 wherein said first power control loop comprises:
    receiver means for receiving at least one signal path corresponding to said first set of bits;
    demodulator means for demodulating each of said at least one signal path to obtain a signed scalar output;
    combining means for combining said signed scalar outputs from said least one signal path to obtain a combined scalar output; and comparison means for comparing said combined scalar outputs against said target energy level and for producing said second set of bits in response to said comparison.

20. The apparatus of claim 19 wherein said demodulator means demodulate each of said at least one signal path to obtain a pilot signal and a filtered data, and wherein said demodulator means further comprises:

dot product circuit means for producing said signed scalar output based on said pilot signal and said filtered data.

21. The apparatus of claim 19 wherein said first power control loop further comprises:

filter means for filtering said combined scalar output to obtain a filtered output; and wherein said comparison means compares said filtered output against said target energy level.

22. The apparatus of claim 18 wherein said second power control loop comprises:

threshold adjust circuit means for increasing said target energy level by an upward step in response to an indication of a frame error and decreasing said target energy level by a downward step in response to an absence of a frame error.

23. The apparatus of claim 22 wherein said target energy level is set at an initial stage of a communication and/or in response to a measured performance of said received signal.

24. The apparatus of claim 22 wherein said upward step and said downward step are set at an initial stage of a communication and/or in response to a measured performance of said received signal.

* * * * *